(12) United States Patent
Pomerleau (10) Patent No.: US 9,375,732 B2
(45) Date of Patent: Jun. 28, 2016

(54) THREE-PHASE SEPARATION SYSTEM FOR DRILLING FLUIDS AND DRILL CUTTINGS

(71) Applicant: FP Marangoni Inc., Calgary (CA)

(72) Inventor: Daniel Guy Pomerleau, Calgary (CA)

(73) Assignee: FP Marangoni Inc. (CA)

( * ) Notice: Subject to any disclaimer, the term of this patent is extended or adjusted under 35 U.S.C. 154(b) by 78 days.

(21) Appl. No.: 14/219,372

(22) Filed: Mar. 19, 2014

(65) Prior Publication Data

US 2014/0202333 A1 Jul. 24, 2014

Related U.S. Application Data (63) Continuation of application No. PCT/CA2012/000835, filed on Sep. 7, 2012.

(60) Provisional application No. 61/536,472, filed on Sep. 19, 2011.

(51) Int. Cl.
| | | |
|---|---|---|
| *B04C 3/06* | (2006.01) | |
| *B04C 9/00* | (2006.01) | |
| *B04C 11/00* | (2006.01) | |

(Continued)

(52) U.S. Cl.
CPC . *B04C 3/06* (2013.01); *B01D 21/06* (2013.01); *B01D 21/267* (2013.01); *B01D 21/34* (2013.01); *B01D 50/002* (2013.01); *B04C 5/13* (2013.01); *B04C 5/15* (2013.01); *B04C 9/00* (2013.01);

(Continued)

(58) Field of Classification Search
CPC ........ B01D 45/16; B01D 21/26; B01D 45/12; B01D 45/00; B03B 9/02; E21B 21/00

USPC .............. 95/271, 269; 55/421; 209/3, 17, 73, 209/281; 175/66, 206, 207

See application file for complete search history.

(56) References Cited

U.S. PATENT DOCUMENTS

| | | |
|---|---|---|
| 2,835,387 A | 5/1958 | Fontein |
| 3,713,499 A | 1/1973 | Arscott et al. |

(Continued)

FOREIGN PATENT DOCUMENTS

| | | |
|---|---|---|
| CN | 1059180 A | 3/1992 |
| CN | 101095990 A | 1/2008 |

(Continued)

OTHER PUBLICATIONS

Chinese Standard Press Chief Newsroom, "China National Standard Assembly", Book, pp. 229-231, Mar. 31, 1999.

(Continued)

*Primary Examiner* — Duane Smith
*Assistant Examiner* — Minh-Chau Pham
(74) *Attorney, Agent, or Firm* — Whitmyer IP Group LLC (57) ABSTRACT

Systems and methods to improve the separation of drill cuttings from drilling fluids using cyclone devices are described. Specifically, a system for separating three phases of a gas/liquid/solid mixture is described. The system includes a cyclone for separating the gas/liquid/solid mixture into a solids component and a gas/liquid mixture; a gas/liquid separator for separating the gas/liquid mixture into a gas component and a liquid component; and a vacuum system for providing a motive force for moving the gas/liquid/solid mixture into the cyclone, moving the separated gas/liquid mixture into the gas/liquid separator and for removing the gas component from the gas/liquid separator.

16 Claims, 4 Drawing Sheets

(51) Int. Cl.
  *B01D 21/06* (2006.01)
  *B01D 21/26* (2006.01)
  *B01D 21/34* (2006.01)
  *B04C 5/13* (2006.01)
  *B04C 5/15* (2006.01)
  *E21B 21/06* (2006.01)
  *B01D 50/00* (2006.01)

(52) U.S. Cl.
  CPC ............... *B04C 11/00* (2013.01); *E21B 21/063* (2013.01); *B04C 2009/007* (2013.01)

(56) References Cited

U.S. PATENT DOCUMENTS

| | | | |
|---|---|---|---|
| 3,774,702 A | 11/1973 | Elenburg | |
| 3,960,734 A * | 6/1976 | Zagorski | B04C 5/103 210/512.2 |
| 4,011,068 A * | 3/1977 | Llewelyn | B04C 5/04 110/101 R |
| 4,246,013 A | 1/1981 | Truhan et al. | |
| 4,279,743 A | 7/1981 | Miller | |
| 4,764,287 A | 8/1988 | Colman et al. | |
| 4,971,685 A | 11/1990 | Stanley et al. | |
| 5,332,500 A | 7/1994 | Seureau et al. | |
| 6,155,429 A | 12/2000 | Clark | |
| 6,348,087 B1 | 2/2002 | Aslin | |
| 6,519,804 B1 * | 2/2003 | Vujik | A47L 5/32 15/331 |
| 6,585,115 B1 * | 7/2003 | Reddoch | E21B 21/066 175/206 |
| 7,380,617 B1 * | 6/2008 | James | E21B 21/066 175/206 |
| 7,841,477 B2 | 11/2010 | Hansen | |
| 2003/0168391 A1 | 9/2003 | Tveiten | |
| 2004/0103784 A1 * | 6/2004 | Birdwell | B01D 45/14 95/270 |
| 2005/0217224 A1 * | 10/2005 | Seebach | B04C 3/00 55/406 |
| 2008/0135300 A1 | 6/2008 | James | |
| 2010/0064893 A1 * | 3/2010 | Hopper | B01D 17/0217 210/787 |
| 2012/0061073 A1 * | 3/2012 | Soni | E21B 27/04 166/99 |
| 2015/0165358 A1 * | 6/2015 | Hemstock | B01D 45/08 95/269 |

FOREIGN PATENT DOCUMENTS

| | | |
|---|---|---|
| CN | 101235709 A | 8/2008 |
| CN | 101279811 A | 10/2008 |
| CN | 201433729 Y | 3/2010 |
| CN | 101748979 A | 6/2010 |
| DE | 2154840 A1 | 5/1973 |
| FR | 2636669 A1 | 3/1990 |
| GB | 651094 A | 3/1951 |
| SU | 793647 A1 | 1/1981 |

OTHER PUBLICATIONS

Chinese Office Action Application No. 2012800454696 Issued: Aug. 20, 2015 14 pages.
Sun, Songyao, "Drilling Machinery", Book, pp. 89-93, Petroleum Industry Press, Aug. 31, 2006.
International Search Report & Written Opinion of the International Searching Authority Application No. PCT/CA2012/000835 Completed: Dec. 20, 2012; Mailing Date: Jan. 15, 2013 8 pages.
Extended European Search Report Application No. 12834226.8 Completed: May 6, 2015; Mailing Date: May 15, 2015 7 pages.
Joint Industry Shaker Technology Committee; Solids Control Equipment in: Shale Shaker and Drilling Fluid Systems; Dec. 31, 1999, Gulf Professional Publishing, pp. 152-155.

* cited by examiner

THREE-PHASE SEPARATION SYSTEM FOR DRILLING FLUIDS AND DRILL CUTTINGS

FIELD OF THE INVENTION

This invention relates to systems and methods to improve the separation of drill cuttings from drilling fluids using cyclone devices. In particular, the invention enables three phase separation of gases, liquids and solids using a vacuum system that improves the quality of recovered drilling fluids.

BACKGROUND OF THE INVENTION

During the drilling process it is necessary for large amounts of drilling fluid to be pumped down the hole in order for the velocity of the fluid in the annulus to be of sufficient velocity to transport the cuttings that are generated at the bit to the surface. These circulating rates are typically in the order of 1-4 m$^3$/min. As is known, this amount of fluid must be rapidly processed over a primary solids removal system which is typically one or more shakers configured to receive the recovered drilling fluid and cuttings. A shaker includes a plurality of screens that are actively vibrated so as to encourage the liquid components to pass through the screen and the solid components (i.e. drill cuttings) to be recovered from the topside of the screen. Shakers generally have a relatively small surface area for the volume of recovered fluids and, as such, must be vibrated at a high rate to provide effective separation.

Cyclones (or cyclone separators) are typically used in the hydrocarbon industry to remove mist or small particles from gas streams by rapidly circulating the gas stream around a circular body to impart a centrifugal force on the particles to effect separation from the gas. Dust removal is a common application. Similarly, a hydrocyclone is used to separate particles entrained in a liquid and a centrifugal decanter is used to separate two liquids. The general operation of each device is described in relation to a cyclone.

Cyclones are typically conical in shape wherein input fluids (gases and liquids with any entrained solids) enter near the top through a tangential nozzle and move in a spiral. As the fluids move, entrained particles are impinged against the wall where they slide down due to gravity for collection, while the gas escapes through the top of the device.

The separation factor of a cyclone is defined as the ratio of centrifugal to gravitational forces:

$$\text{Separation Factor} = \frac{F_{centrifugal}}{F_{gravity}} = \frac{\frac{mu_{tan}^2}{rg_c}}{\frac{mg}{g_c}} = \frac{u_{tan}^2}{rg}$$

In most cyclones the particles being separated are small enough that Stokes' Law can be used to determine the drag force. This means that the force balance on a particle under centrifugal force becomes $$\left(\frac{\pi d_p^3}{6}\rho_p\right)\frac{dv}{dt} = \left(\frac{\pi d_p^3}{6}\rho_p\right)\frac{r\omega^2}{g_c} - \frac{3\pi\mu d_p v_{radial}}{g_c} - \left(\frac{\pi d_p^3}{6}\rho\right)\frac{r\omega^2}{g_c} =$$

$$\frac{\pi d_p^3 r\omega^2}{6g_c}(\rho_p - \rho) - \frac{3\pi\mu d_p v_{radial}}{g_c}$$

Since the acceleration phase for the moving particle is fairly brief, the velocity can be treated as constant with respect to time (though not with respect to position) and the force balance solved for the radial velocity $$0 = \frac{\pi d_p^3 r\omega^2}{6g_c}(\rho_p - \rho) - \frac{3\pi\mu d_p v_{rad}}{g_c}$$

$$v_{rad} = \frac{\pi d_p^3 r\omega^2(\rho_p - \rho)}{6g_c}\frac{g_c}{3\pi\mu d_p} = \frac{d_p^2(\rho_p - \rho)r\omega^2}{18\mu}$$

which can in turn be expressed in terms of the gravitational terminal velocity and the tangential velocity $$v_{rad} = \left(\frac{d_p^2(\rho_p - \rho)}{18\mu}\frac{g}{g}\right)(r\omega^2) = \frac{\mu_i}{g}\frac{\mu_{tan}^2}{r}$$

From these equations, it can be seen that the higher the terminal velocity, the higher the radial velocity, and thus the easier the separation.

In the foregoing: g=gravitational constant 981.65 cm/s$^2$ 9.81 m/s$^2$; r=radius of rotation (m); ω=angular velocity in radians s$^{-1}$; μ=dynamic viscosity (Pa·s); d$_p$=particle diameter (m); ρ$_p$=particle density (kg/m$^3$) and, ρ=fluid/gas density (kg/m$^3$).

A review of the prior art reveals that cyclones have been used in various systems in the past. For example, U.S. Pat. No. 4,279,743 utilizes injected air bubbles to cause the boundary layer on the wall of the cyclone to be disrupted causing solid particles to separate from the fluid carrier; U.S. Pat. No. 4,971,685 uses injected air to create a froth in the hydrophobic part of the slurry allowing it to be recovered and the hydrophilic portion discharges; U.S. Pat. No. 6,155,429 injects air at very low concentrations and rates relative to the liquid phase(s); U.S. Pat. No. 7,841,477 and U.S. Pat. No. 4,764,287 are two phase cyclones; U.S. Pat. No. 6,348,087 is a three phase cyclone separator that requires three chambers; and, U.S. Pat. No. 5,332,500 describes a three phase cyclone designed to separate two fluids with different densities.

SUMMARY OF THE INVENTION

In accordance with a first aspect of the invention, there is provided a system for separating a gas/liquid/solid mixture comprising: a cyclone for receiving a gas/liquid/solid mixture from a source, the cyclone having an inlet for introducing the gas/liquid/solid mixture into the cyclone, an outlet for removing a separated gas/liquid mixture from the cyclone and a discharge for removing separated solids from the cyclone; a gas/liquid separator operatively connected to the outlet for receiving the separated gas/liquid mixture from the cyclone and for separating the gas/liquid to a gas component and a liquid component; and a vacuum system operatively connected to the gas/liquid separator for providing a motive force for moving the gas/liquid/solid mixture into the cyclone, for moving the separated gas/liquid mixture into the gas/liquid separator and removing the gas component from the gas/liquid separator.

In a further embodiment, the system includes throttle means operatively connected between the cyclone and gas/liquid separator for controlling the flow rate of the gas/liquid/solid into the cyclone.

In another embodiment, the cyclone includes a scroll and scroll drive means for assisting in conveying separated solids within the cyclone to the discharge.

In another embodiment, the cyclone includes an outlet throttle for adjusting a vertical position of the outlet within the cyclone.

In yet another embodiment, the cyclone includes a discharge throttle for adjusting a vertical position of the cyclone discharge.

In yet another embodiment, the source is operatively connected to a drill cuttings shaker and the shaker separates a drill cuttings/drilling fluid mixture over at least one screen to form a drill cuttings/drilling fluid underflow and the source is the drill cuttings/drilling fluid underflow. In one embodiment, a bleed valve is operatively connected to the system between the drill cuttings/drilling fluid underflow and the cyclone for mixing air with the drill cuttings/drilling fluid underflow prior to delivery to the cyclone.

In another aspect, the invention provides a method of separating a gas/liquid/solids mixture comprising the steps of: a) introducing the gas/liquid/solid mixture into a cyclone and separating the gas/liquid/solid mixture into a separated gas/liquid mixture and solid component, the cyclone having an outlet for removing the separated gas/liquid mixture from the cyclone and a discharge for removing the solid component from the cyclone; and b) introducing the separated gas/liquid mixture into a gas/liquid separator operatively connected to the outlet and separating the gas/liquid to a gas component and a liquid component; wherein the cyclone and gas/liquid separator are operated by a vacuum source operatively connected to the gas/liquid separator.

In another embodiment, the method includes the step of controlling the flow rate of the gas/liquid/solids mixture downstream of the cyclone.

In another embodiment, the method includes the step of mixing a volume of gas into the gas/liquid/solid mixture prior to introducing the gas/liquid/solid mixture into the cyclone.

In another embodiment, the method includes the step of controlling the volume of gas mixed into the gas/liquid/solid mixture.

In yet another embodiment, the cyclone is operatively connected to a shaker receiving drilling fluid/drill cuttings from a well, the shaker having a vacuum screen system and the volume of gas mixed with the gas/liquid/solid mixture is controlled to prevent stalling of drill cuttings on the shaker.

In another aspect, the invention provides a cyclone for receiving a gas/liquid/solid mixture from a source and separating the gas/liquid/solid mixture to a separated gas/liquid mixture and a solid component, the cyclone comprising: a cyclone body having: an inlet for introducing the gas/liquid/solid mixture into the cyclone; an outlet for removing a separated gas/liquid mixture from the cyclone; and a discharge for removing separated solids from the cyclone; wherein the cyclone includes a scroll within the cyclone body and scroll drive means, the scroll and scroll drive means for assisting in conveying separated solids within the cyclone to the discharge.

In another aspect the invention provides a cyclone for receiving a gas/liquid/solid mixture from a source and separating the gas/liquid/solid mixture to a separated gas/liquid mixture and a solid component, the cyclone comprising: a cyclone body having: an inlet for introducing the gas/liquid/solid mixture into the cyclone; an outlet for removing a separated gas/liquid mixture from the cyclone; and a discharge for removing separated solids from the cyclone; wherein the cyclone includes an outlet throttle for adjusting a vertical position of the outlet within the cyclone.

BRIEF DESCRIPTION OF THE DRAWINGS

The invention is described with reference to the accompanying figures in which.

DETAILED DESCRIPTION OF THE INVENTION

With reference to the figures, systems and methods to effect separation of drilling fluids and drill cuttings using cyclone devices are described.

Figure 1:
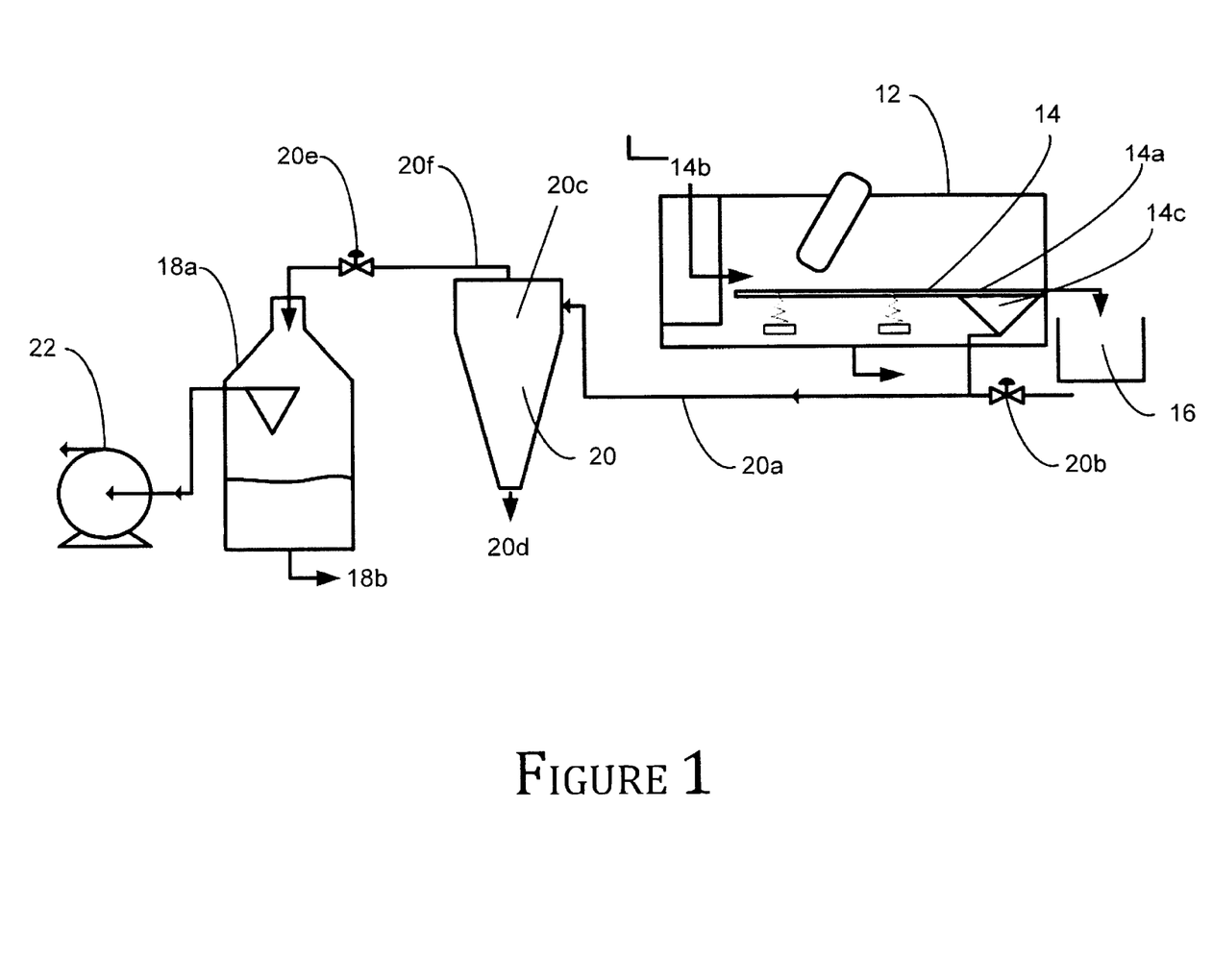
FIG. 1 is a schematic diagram of a cyclone system in accordance with one embodiment of the invention coupled to a shaker.

With reference to FIG. 1, a typical solids control system at a well site includes a shaker 12 that receives drilling fluid containing drill cuttings from downhole drilling operations. The shaker 12 includes a shaker bed 14 having a plurality of screens 14a that are used to effect separation of drilling fluid from drill cuttings that are received from the well 14b. As is known with shaker systems, recovered drilling fluid is collected from the underside of the screens for further processing and/or re-use in the well. The recovered drilling fluid may also be collected from different sections of the screen bed and thereby be subject to different primary and post-separation techniques including the use of a vacuum manifold 14c as described in Applicant's co-pending applications incorporated herein by reference. Separated drill cuttings are generally collected from the end of the shaker in a hopper 16.

In accordance with one embodiment of the invention, recovered drilling fluid from the shaker is subjected to post-processing using a cyclone device 20 under the action of a vacuum pump 22. The vacuum pump 22 is connected to cyclone 20 through fluid/air separator 18 wherein the vacuum pump draws air through the fluid/air separator and cyclone as the motive force of drawing drilling fluid through the cyclone. Importantly, the drilling fluid recovered from the shaker, which will contain some solid drill cutting particles that have passed through the screen, will be rapidly mixed with air entering the pipe connection system 20a either from the vacuum manifold 14c or through bleed valve 20b between the shaker and cyclone such that the relative volume of air to liquid volume and/or the flow rate will be sufficiently high to ensure effective transport to the cyclone and that the liquid volume is fully mixed with the air volume without settling or separation of the two heavier phases. That is, the relatively high proportion of air and flow rates are maintained to prevent line plugging and to provide a high speed to the fluid entering the cyclone. Flow is also controlled by valve 20e in line 20f.

Upon entering the cyclone, fluids will be rapidly circulated around the circular upper regions of the cyclone thereby imparting a high centrifugal force to the fluids. The higher density solids entrained within the liquids will be subjected to higher centrifugal forces than the liquid phase thereby effecting separation of the solids relative to the liquids. As liquid/solid separation is occurring, friction against the cyclone surfaces will cause the outermost materials to slow down wherein gravity will then cause those materials to fall towards the outlet 20d of the cyclone where they can be recovered. While it is understood that the materials recovered from the outlet will be predominantly solid, some liquid phase will be retained on the solids.

The majority of the liquid phase and gas phase will generally be drawn off the top of the cyclone where it enters the liquid/air separator wherein liquid/gas separation will occur. Gas will be drawn from the liquid/air separator through outlet 18a to vacuum pump 22. Liquid can be removed through outlet 18b.

In operation, the flow of materials through the system from the shaker to each of the vacuum pump, liquid/air separator and cyclone is controlled to maximize the separation of each phase from one another. In other words, the system is generally operated to ensure maximum solids separation/recovery at the cyclone, liquid separation at the liquid/air separator and gas through the vacuum pump.

In order to effect such control, an operator will generally set the vacuum pump to operate at a fixed rate that establishes a maximum flow rate of air through the system. As the flow rate of fluids/solids recovered off the shaker will vary due to normal fluctuations in flow, the flow of air through valves 20b and 20e is controlled so as to control solids recovery from the cyclone. For example, if the valves 20b and 20e are left wide open with maximum air flow through the system and there is a relatively low amount of liquid entering the system, the relative speed of the liquid will be high when entering the cyclone which will decrease the time available for separation which will result in an increased carry-over of solids into the gas/liquid separator. Thus, the operator will slow down the relative speed of flow by adjusting valves 20b and 20e to decrease the flow speed in the cyclone.

Similarly, if the volume of fluid recovered off the shaker increases, the relative speed of flow within the cyclone may decrease (due to frictional forces) such that increased liquid volume is observed at the discharge of the cyclone. As such, the flow rate within the cyclone may be increased by opening valves 20b and 20e.

It is important to note that valve 20b may not be required when the cyclone system is connected to systems other than shakers. In the vacuum shaker implementation, valve 20b may also be operated to control the relative flow of air through the vacuum manifold 14c so as to optimize fluid/cuttings separation on the shaker. In other words, opening the valve 20b so as to increase the airflow into the system downstream of the vacuum manifold will decrease the vacuum pull at the screen and may be used to prevent cuttings stalling on the shaker screens. Alternatively, decreasing airflow into the system at valve 20b may be used to increase the vacuum pull at the screen to increase the fluids/cuttings separation on the shaker screens.

Importantly, in each case, the cyclone is operated with a vacuum pull downstream of the cyclone which provides a number of advantages in a solids control/drilling fluid recovery system namely that the fluids and solids are conveyed within an air/fluid mixture wherein the fluid does not come into contact with a pump or high shearing forces prior to the solids separation. As such, and in particular in a drill fluid recovery system, entrained solids are subjected to fewer shearing forces that may cause the degradation of the solids to finer particles that then become suspended within the drilling fluid and thus degrade the quality of the recovered drilling fluid.

Figure 2:
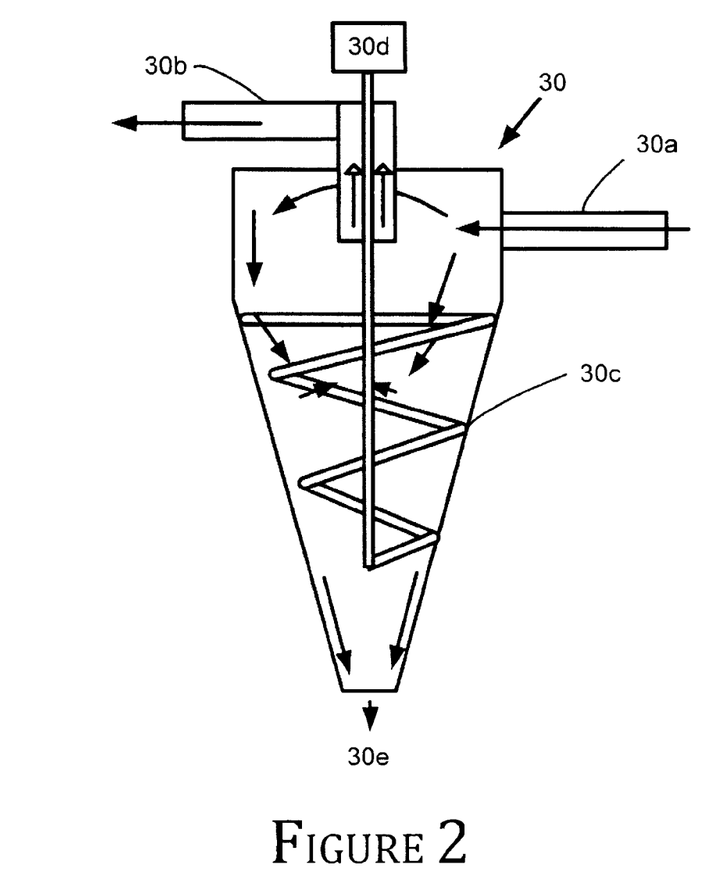
FIG. 2 is a schematic diagram of a cyclone system with a scroll in accordance with one embodiment of the invention.

In a further embodiment of the cyclone systems in accordance with the invention, reference is made to FIG. 2. In this embodiment, a cyclone 30 having an inlet 30a and outlet 30b is provided with a scroll 30c driven by a scroll motor 30d. The scroll 30c is configured to inside surfaces of the cyclone in the lowered tapered regions and is operated to promote the transfer of solids to the discharge 30e.

Figure 2A:
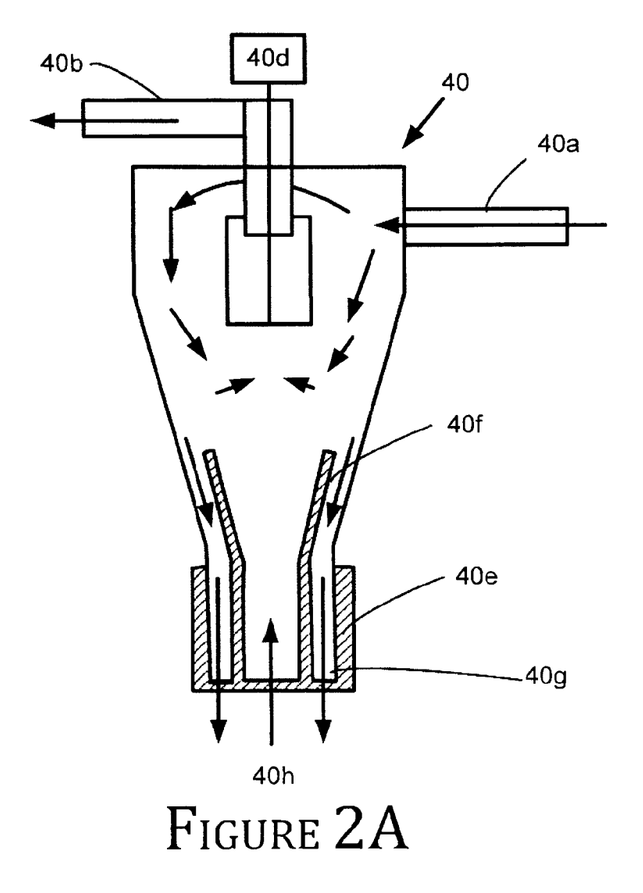
FIG. 2A is a schematic diagram of a cyclone system with a throttle system in accordance with one embodiment of the invention.

As shown in FIG. 2A another embodiment of a cyclone is described in which the cyclone is provided with additional throttling means that can be operated to provide greater control to the separation processes within the cyclone. As shown, a cyclone 40 includes an inlet 40a and outlet 40b. The outlet 40b is further provided with a throttling sleeve 40c that can be raised and lowered within the cyclone by throttle adjustment system 40d. By lowering or raising the throttling sleeve 40c, the residence time of fluids within the the cyclone can be adjusted. In addition or alternatively, the discharge port of the cyclone can be provided with a discharge baffle/throttle 40f, 40g system that can similarly be used to adjust the operation of the cyclone and specifically the separation of fluids and solids. In this embodiment, the baffle 40f may be lowered or raised so as adjust the gap 40g and hence the flow of air into the discharge end 40h. The baffle 40f may be configured to narrow or widen the gap as the throttle is lowered or raised. The baffle/throttle system can be used to isolate solids from the cyclonic flow and thus flow more readily out of the cyclone. The variable length and diameter exhaust can also be used to move the vortex upper or lower within the cyclone body.

Field Data

A field trial was conducted in which a cyclone was incorporated into a solids control system including a vacuum shaker as described above. As shown in Table 1, drilling fluid recovered from the cyclone system at the liquid/air separator and from the underside of the shaker was compared.

TABLE 1

| Drilling Fluid Recovery Data using in line Cyclone Separator | | | |
|---|---|---|---|
| | Drilling Fluid Density | Cyclone Underflow | Recovered Fluid Density |
| Cyclone | 1030 kg/m³ | 1250 kg/m³ | 1000 kg/m³ |
| No Cyclone | 1030 kg/m³ | N/A | 1180 kg/m³ |

Importantly, the field tests shows three phase recovery on a drilling fluid with a vacuum powered cyclone. The field trial with the cyclone demonstrates that the recovered fluid density is substantially lower with the cyclone indicating improved drilling fluid quality from the cyclone separation.

As noted above and as described in Applicant's co-pending applications, the vacuum screen system recovers both fluid and fine solids and requires regulation of the vacuum to prevent the stalling of cuttings on the vacuum screen. Excess vacuum can be relieved by bleed valve 20b typically located close to the the vacuum-screen manifold to ensure that maximum air velocity is employed below the manifold to ensure that the fluid/solid slurry is effectively transported to the recovery tank 18a without line plugging.

Particle Size Analysis

Figure 3:
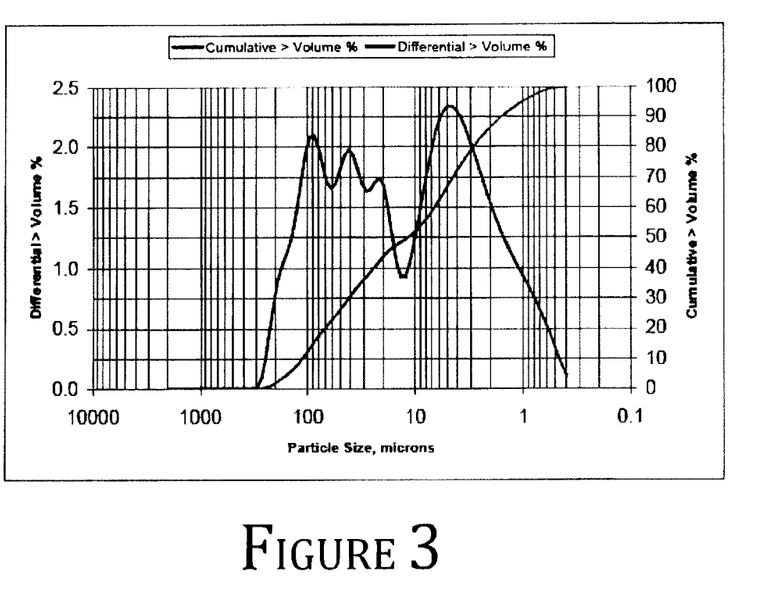
FIG. 3 is a chart showing a particle size distribution analysis of the discharge for a drilling fluid processed by a cyclone separator operated in accordance with the invention.

Particle size analysis was conducted on raw drilling fluid samples processed within a cyclone and recovered from the cyclone discharge. As shown in FIG. 3, the cyclone was capable of removing particles down to less than 1 micron in size. This is compared to the manufacturer's specification which indicated that operating the cyclone in the conventional manner with liquids only (i.e. without a carrier gas), a 8 micron cut could be achieved. Thus, operating the cyclone with a carrier gas provides a substantial improvement over the manufacturer's specifications.

Figure 4:
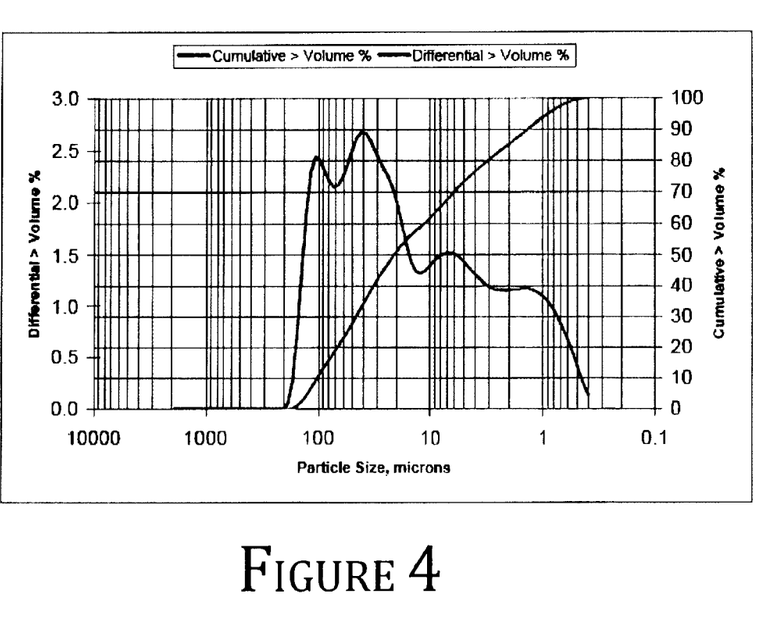
FIG. 4 is a chart showing a particle size distribution analysis for a drilling fluid recovered by a vacuum shaker in accordance with the prior art; and, FIG. 5 is a chart showing a particle size distribution analysis of the overflow for a drilling fluid processed by a centrifuge in accordance with the prior art.
Figure 5:
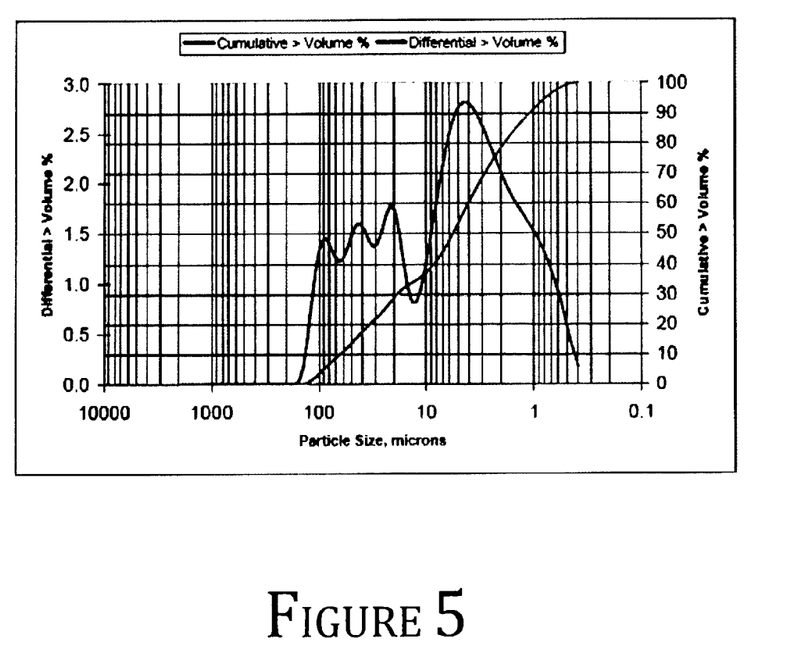

For comparison, FIG. 4 shows a typical particle size distribution for drilling fluids recovered from a shaker incorporating a vacuum screen but no cyclone and FIG. 5 shows a typical particle size distribution for drilling fluids processed in a centrifuge.

Advantages

The low density of the air fluid carrier (1.25 kg/m$^3$) in the cyclone and the low dynamic viscosity of air ($1.78 \times 10^{-5}$ Pa·s) improve the separation forces amongst the three phases entering the cyclone. Further the removal of additional solids by the cyclone reduces the problem of sedimentation in the recovery line by reducing the possibility of line plugging.

In addition, by pulling a volume of air through the cyclone the system can be readily controlled with respect to the relative force of cuttings liquid hitting the cyclone and can be more readily adjusted to account for the viscosity of the fluid.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A system for separating a gas/liquid/solid mixture comprising:
   a cyclone for receiving a gas/liquid/solid mixture from a source, the cyclone having:
   an inlet for introducing the gas/liquid/solid mixture into the cyclone;
   an outlet for removing a separated gas/liquid mixture from the cyclone;
   a discharge for removing separated solids from the cyclone; and
   a first throttle located near the outlet for adjusting a vertical position of the outlet within the cyclone;
   a gas/liquid separator operatively connected to the outlet for receiving the separated gas/liquid mixture from the cyclone and for separating the gas/liquid to a gas component and a liquid component; and
   a vacuum system operatively connected to the gas/liquid separator for providing a motive force for moving the gas/liquid/solid mixture into the cyclone, for moving the separated gas/liquid mixture into the gas/liquid separator and removing the gas component from the gas/liquid separator.

2. The system of claim 1, further comprising a valve operatively connected between the cyclone and gas/liquid separator for controlling the flow rate of the gas/liquid/solid into the cyclone.

3. The system of claim 1, wherein the cyclone includes a scroll driven by a scroll motor, the scroll for assisting in conveying separated solids within the cyclone to the discharge.

4. The system of claim 1, wherein the cyclone includes a discharge baffle or throttle located near the discharge for adjusting a vertical position of the cyclone discharge.

5. The system of claim 1, wherein the source is operatively connected to a drill cuttings shaker and the shaker separates a drill cuttings/drilling fluid mixture over at least one screen to form a drill cuttings/drilling fluid underflow and the source is the drill cuttings/drilling fluid underflow.

6. The system of claim 5, further comprising a bleed valve operatively connected to the system between the drill cuttings/drilling fluid underflow and the cyclone for mixing air with the drill cuttings/drilling fluid underflow prior to delivery to the cyclone.

7. A method of separating a gas/liquid/solids mixture, comprising the steps of:
   a) introducing the gas/liquid/solid mixture into a cyclone and separating the gas/liquid/solid mixture into a separated gas/liquid mixture and solid component, the cyclone having an outlet for removing the separated gas/liquid mixture from the cyclone, a discharge for removing the solid component from the cyclone, and a first throttle located near the outlet for adjusting a vertical position of the outlet within the cyclone; and,
   b) introducing the separated gas/liquid mixture into a gas/liquid separator operatively connected to the outlet and separating the gas/liquid to a gas component and a liquid component;
   wherein the cyclone and gas/liquid separator are operated by a vacuum source operatively connected to the gas/liquid separator.

8. The method of claim 7, further comprising the step of controlling the flow rate of the gas/liquid/solids mixture downstream of the cyclone.

9. The method of claim 7, further comprising the step of mixing a volume of gas into the gas/liquid/solid mixture prior to introducing the gas/liquid/solid mixture into the cyclone.

10. The method of claim 9, further comprising the step of controlling the volume of gas mixed into the gas/liquid/solid mixture.

11. The method of claim 10, wherein the cyclone is operatively connected to a shaker receiving drilling fluid/drill cuttings from a well, the shaker having a vacuum screen system and the volume of gas mixed with the gas/liquid/solid mixture is controlled to prevent stalling of drill cuttings on the shaker.

12. A cyclone for receiving a gas/liquid/solid mixture from a source and separating the gas/liquid/solid mixture to a separated gas/liquid mixture and a solid component, the cyclone comprising:
    a cyclone body having:
    an inlet for introducing the gas/liquid/solid mixture into the cyclone;
    an outlet for removing a separated gas/liquid mixture from the cyclone;
    a discharge for removing separated solids from the cyclone; and
    a discharge baffle or throttle located near the discharge for adjusting a vertical position of the cyclone discharge.

13. A cyclone for receiving a gas/liquid/solid mixture from a source and separating the gas/liquid/solid mixture to a separated gas/liquid mixture and a solid component, the cyclone comprising:
    a cyclone body having:
    an inlet for introducing the gas/liquid/solid mixture into the cyclone,
    an outlet for removing a separated gas/liquid mixture from the cyclone; and
    a discharge for removing separated solids from the cyclone;
    wherein the cyclone includes a first throttle located near the outlet for adjusting a vertical position of the outlet within the cyclone.

14. The cyclone of claim 13, wherein the cyclone includes a discharge baffle or throttle located near the discharge for adjusting a vertical position of the cyclone discharge.

15. The cyclone of claim 13, wherein the cyclone includes a scroll within the cyclone body driven by a scroll motor, the scroll for assisting in conveying separated solids within the cyclone to the discharge.

16. The cyclone of claim 12, wherein the cyclone includes a scroll within the cyclone body driven by a scroll motor, the scroll for assisting in conveying separated solids within the cyclone to the discharge.

* * * * *